United States Patent [19]

Kyoshima

[11] Patent Number: 4,740,800

[45] Date of Patent: Apr. 26, 1988

[54] LIQUID JET RECORDING HEAD

[75] Inventor: Masayuki Kyoshima, Hiratsuka, Japan

[73] Assignee: Canon Kabushiki Kaisha, Tokyo, Japan

[21] Appl. No.: 15,120

[22] Filed: Feb. 17, 1987

[30] Foreign Application Priority Data

Feb. 18, 1986 [JP] Japan .................................. 61-31807
Jun. 25, 1986 [JP] Japan .................................. 61-147061

[51] Int. Cl.$^4$ ...................... G01D 15/16; G01D 15/18; B44C 1/52

[52] U.S. Cl. ................................. 346/140 R; 156/656

[58] Field of Search .................... 346/76 PH, 140 PD; 156/655, 656, 659.1

[56] References Cited

U.S. PATENT DOCUMENTS

| | | | |
|---|---|---|---|
| 4,339,762 | 7/1982 | Shirato et al. | 346/140 R |
| 4,370,668 | 1/1983 | Hara et al. | 346/140 R |
| 4,429,321 | 1/1984 | Matsumoto | 346/140 R |
| 4,458,256 | 7/1984 | Shirato et al. | 346/140 R |
| 4,602,261 | 7/1986 | Matsuda et al. | 346/140 R |
| 4,609,427 | 9/1986 | Inamoto et al. | 346/140 PD |
| 4,624,740 | 11/1986 | Abrams et al. | 156/655 X |
| 4,631,555 | 12/1986 | Ikeda et al. | 346/140 R |
| 4,646,110 | 2/1987 | Ikeda et al. | 346/140 PD |
| 4,648,938 | 3/1987 | Ashby et al. | 156/655 X |

*Primary Examiner*—E. A. Goldberg
*Assistant Examiner*—Patrick W. Foster
*Attorney, Agent, or Firm*—Fitzpatrick, Cella, Harper & Scinto

[57] ABSTRACT

There is disclosed a liquid jet recording head comprising:

a plurality of discharge ports through which liquid is discharged;

a plurality of electro-thermal converting elements, each provided correspondingly to each discharge port and generating thermal energy used for discharging said liquid, the electro-thermal converting elements having a heat resistive layer provided on a substrate and an electrically, conductive layer for forming at least one set of electrodes electrically connected to the heat resistive layer; and a dummy heater provided adjacent to a group of plural elements of the heat resistive layer.

23 Claims, 4 Drawing Sheets

LIQUID JET RECORDING HEAD

BACKGROUND OF THE INVENTION

1. Field of the Invention

The present invention relates to a liquid jet recording head arranged in a liquid jet recorder which discharges recording liquid (ink) as flying droplets to record characters on a record medium, and more particularly to a liquid jet recording head which discharges liquid by action of thermal energy and the substrate used for the above head.

2. Related Background Art

Generally, a recording head of a liquid jet recorder which uses the above jetting method, as shown in FIG. 8, comprises an orifice 105 for discharging the liquid, a liquid discharge unit having a liquid flow path 265 which includes a thermal action unit for applying thermal energy to the liquid for discharging the liquid, and electro-thermal transducer 103 for generating the thermal energy. For example, such recording head is disclosed in U.S. Pat. No. 4,602,261. The electro-thermal transducer comprises a pair of electrodes and a heat generating resistive layer having a heat generation area, connected to the electrodes. The thermal energy generated by the electro-thermal transducer acts on the liquids to generate air bubbles which cause rapid state change due to volume expansion and contraction.

The volume of the air bubbles correlates to the droplet diameter. Accordingly, in order to attain high quality printing and uniform printing, it is required that constants of the heat generation resistive layers corresponding to each orifice of the recording head are uniform.

The heat generation resistive layer is formed into a described shape by an etching process. In the etching process, etching solution is circulated more efficiently in the opposite end areas of the heat generating resistors than in the center area (edge effect of etching) and the etching proceeds more rapidly in the end areas. As a result, the resistive layer is narrowed widthwise.

FIG. 1 shows a distribution of the width of the heat generation resistive layer in the prior art recording head. It is seen that the width of the heat generation resistive layer at the end areas is smaller than that in the center area. As a result, in the prior art recording head, the recording density is not uniform in the direction of arrangement of the heat generation resistive layers, and the print density is lower as it goes toward the opposite ends from the center.

SUMMARY OF THE INVENTION

It is an object of the present invention to provide a liquid jet recording head which eliminates ununiformity due to ununiform width of the heat generation resistive layer of the electro-thermal transducer to allow recording of a high quality image.

In accordance with the present invention, the liquid jet recording head comprises a plurality of discharge ports for discharging liquid to form flying droplets, a plurality of electro-thermal transducers, one for each of the discharge ports, manufactured by an etching process and each having a heat generation resistive layer for generating thermal energy utilized to form the droplets, and layers, arranged on both sides of the electro-thermal transducers, of the same material as that of the heat generation resistive layer or having the same etching rate as that of the heat generation resistive layer.

In accordance with the present embodiment, when the heat generation resistive layer of the electro-thermal transducer for forming the droplets is manufactured, the affect of the circulation of the etching solution at the end areas is prevented from extending to the heat generation resistive layer by the layers arranged on the both sides of the heat generation resistive layer, and the width of the heat generation area is uniform.

It is one object of the present invention to provide a liquid jet recording head comprising:

a plurality of discharge ports through which liquid is discharged;

a plurality of electro-thermal converting elements, each provided correspondingly to each discharge port and generating thermal energy used for discharging said liquid, and said electro-thermal converting element having a heat resistive layer provided on a substrate and an electrically conductive layer for forming at least one set of electrode electrically connected to said heat resistive layer;

and a dummy heater provided adjacent to a group of plural elements of said heat resistive layer.

It is another object of the present invention to provide a substrate for a liquid jet recording head, comprising a plurality of electro-thermal converting elements provided on a support member, said element having a heat resistive layer provided on said support member and an electrically conductive layer for forming at least one set of electrode electrically connected to said heat resistive layer, and dummy heater provided on said support member and adjacent to at least both sides of the row of said plural elements.

It is further another object of the present invention to provide a substrate for a liquid jet recording head formed by the following steps:

forming a heat resistive layer for a plurality of electro-thermal converting elements in an area of a support member, said area including at least both sides of the row of said electro-thermal converting elements; and etching said formed heat resistive layer under the condition that dummy portion is provided in said both sides, so as to cause the etching rate of the resistive layer all over the area in which at least heat generating portion is provided to be constant.

DETAILED DESCRIPTION OF THE PREFERRED EMBODIMENTS

Figure 1:
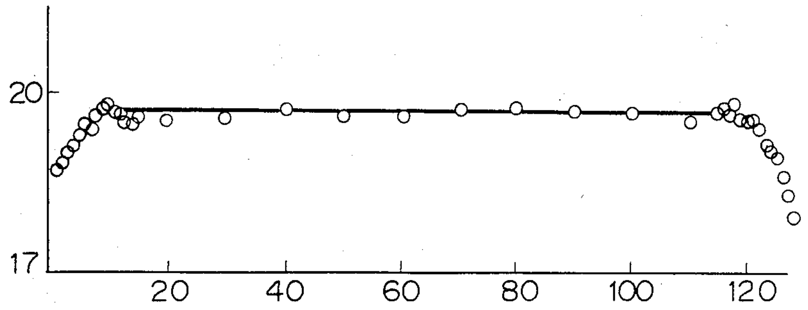
FIG. 1 shows a distribution of heat generation resistive layer width of the present prior art head.
Figure 2:
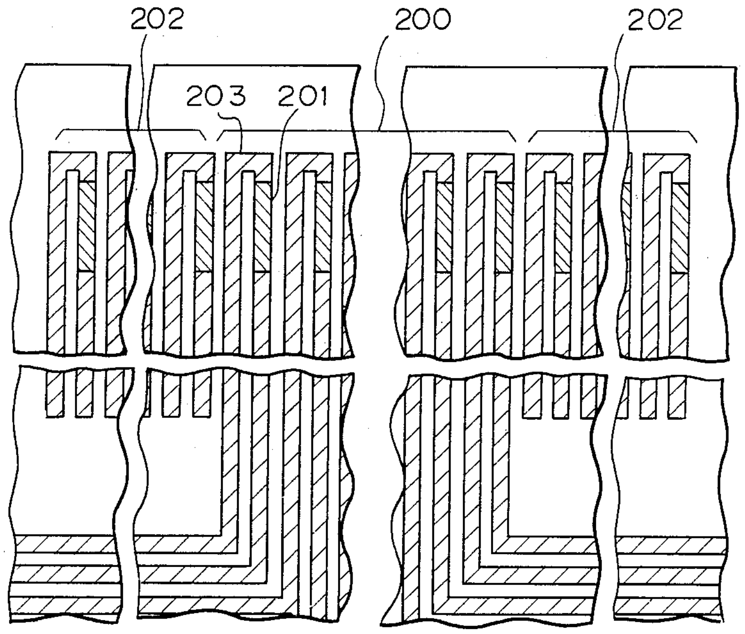
FIG. 2 shows a plan view of an embodiment of a liquid jet recording head of the present invention.

FIG. 2 shows an embodiment of a liquid jet recording head of the present invention. Numeral 200 denotes a set of electro-thermal transducers (heaters) for use in discharging liquid. Each heater has a heat generation resistive layer 201 and an electrode layer 203. Numeral 202 denotes a set of electro-thermal transducers (dummy heaters) which are arranged on both sides of the heaters 200, which are used to make the areas of the heat generation resistive layers 201 of the heaters uniform and which do not relate to the liquid discharge. As many dummy heaters as are sufficient (for example, ten or more) to prevent the affect of the edge effect of the etching from extending to the heaters 200 may be provided in the same process as the heaters.

In other words, in the present embodiment, more heaters than those required to record the image are prepared and the heaters excluding certain number of heaters at the opposite ends are used as actual heaters. Thus, the head is not affected by the process and uniform and defect-free heads are provided.

The dummy heater may be of the same construction as the heater, but since it is not used to form the droplet, it need not generate heat between the pair of electrodes (or electro-conductive layer). Accordingly, wiring to a drive signal source is not necessary and it is sufficient to arrange it on a substrate.

The liquid jet recording head of the present invention is manufactured in the following steps.

An $SiO_2$ film having a thickness of 5 $\mu m$ is formed on a surface of an Si wafer by thermal oxidization. An $HfB_2$ heat generation resistive layer is sputtered to a thickness of 1500 Å, and an Al layer is deposited to a thickness of 5000 Å by an electron beam deposition method.

It is then patterned into desired heat generation shape and electrode shape by a photolithography process. Then, an $SiO_2$ layer is deposited to a thickness of 2.5 $\mu m$ by a high rate sputtering method.

Then, a polyimide film (3 $\mu m$) such as Hitachi Chemical PIQ is patterned as a Ta lift off resist, and a Ta film (1.0 $\mu m$) is formed by a DC sputtering method. After the formation of the Ta film, the PIQ film is removed and the Ta film is patterned. In this manner, the substrate is prepared.

Finally, in order to form a liquid supply path, a heat action area and an orifice, a grooved glass plate is positioned such that the groove is arranged at an appropriate positional relationship with the heat generation area formed on the substrate, and it is bonded to the substrate.

If the shape of the dummy heaters is different from the shape of the heaters 200 as shown, the dummy heaters and the heaters can be readily distinguished and the wiring of the heaters is facilitated.

Figure 9:
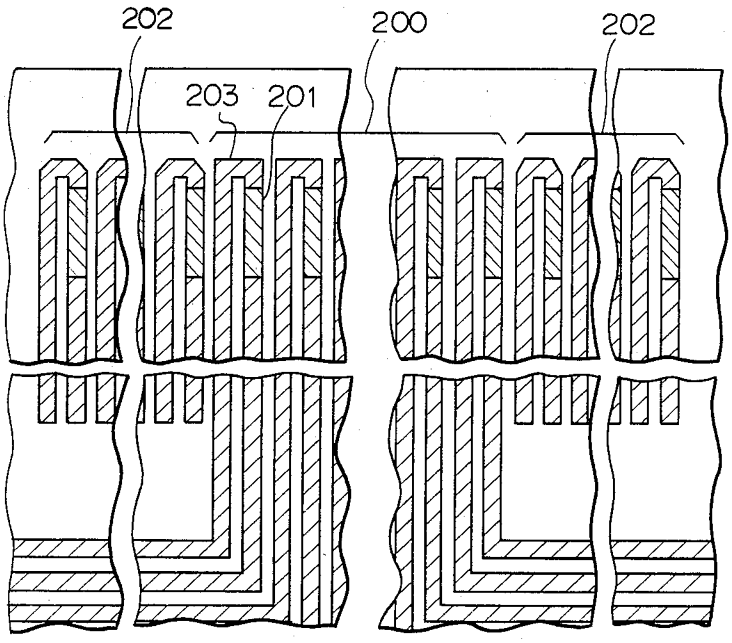

FIG. 9 shows another embodiment according to the present invention. The portion denoted by reference numeral 202 is a set of dummy heaters. In the embodiment, the shape of the dummy heaters is different from that of heaters 201, 203 included in the set of the heaters 200. However, both the dummy heaters and the heaters may be fabricated by the similar step. The difference between the shapes of them is used for the easy discrimination between them, so that the connection between them and the heater wiring can be easily and surely performed.

Although in the above two embodiments, the electrodes are also formed in the dummy heater, the formation of the electrodes in the dummy heater is not necessary because the dummy heater is not used for discharging the liquid.

Figure 3:
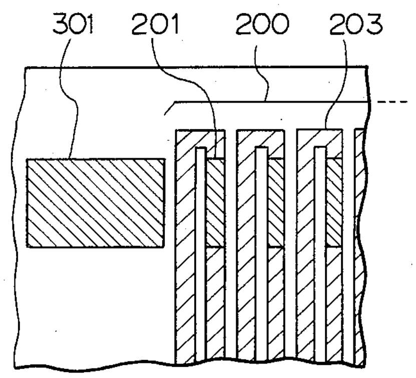
FIGS. 3, 4 and 9 show plan views of other embodiments of the liquid jet recording head of the present invention.

FIG. 3 shows another embodiment of the liquid jet recording head of the present invention. In the present embodiment, rectangular resistive layers 301 having a sufficient width to prevent the heaters from being narrowed are arranged in adjacent to the liquid discharge heaters 200, as the dummy heaters.

The recording head of the present embodiment can be manufactured in the same manner as the first embodiment. Since the resistive layers 301 do not relate to the liquid discharge, they need not be wired.

Figure 4:
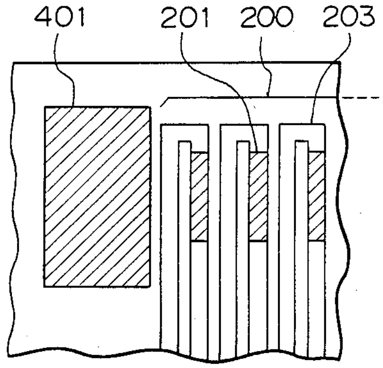

FIG. 4 shows an embodiment in which resistive layers 401 having different size from the rectangular resistive layers 301 of FIG. 3 are provided.

Figure 5:
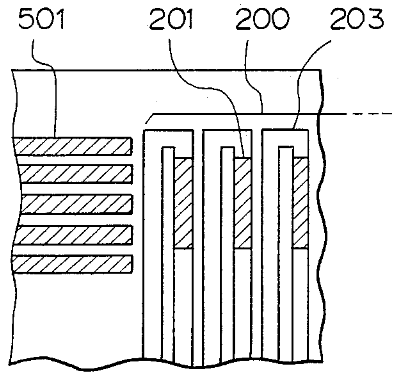
FIG. 5 shows a plane view of other embodiment of the liquid jet recording head of the present invention in which the dummy resistive layer has a stripe shape.
Figure 6:
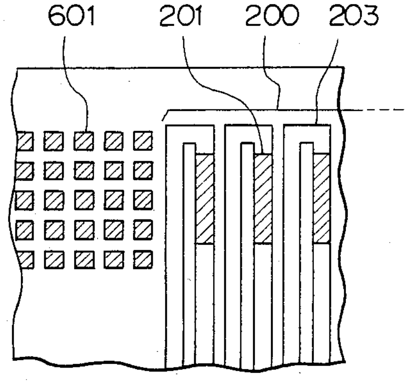
FIG. 6 shows a plane view of other embodiment of the liquid jet recording head of the present invention in which the dummy resistive layer has a lattice shape.

In FIGS. 5 and 6, the resistive layers of the embodiment of FIG. 3 or 4 are sub-divided to form resistive layers 501 and 601. That is, in FIG. 5, the dummy resistive layers has a stripe-shape, and in FIG. 6, the dummy resistive layer has a lattice shape. In those embodiments, the $HfB_2$ layer is easy to fuse because of the increase of the boundary areas of the resistive layers shown in FIGS. 3–6 and 9.

Figure 7:
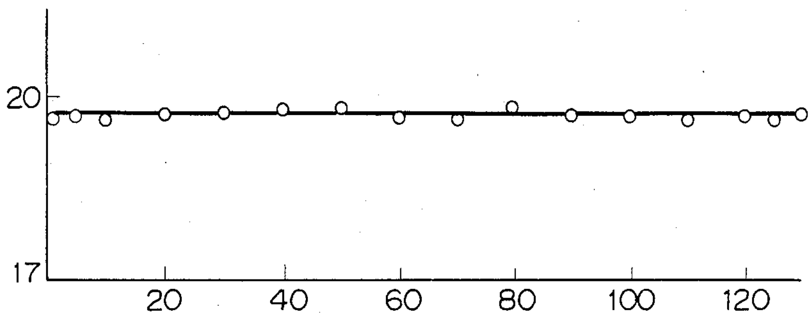
FIG. 7 shows a distribution of heat generation resistive layer width of the recording head according to the present invention.
Figure 8:
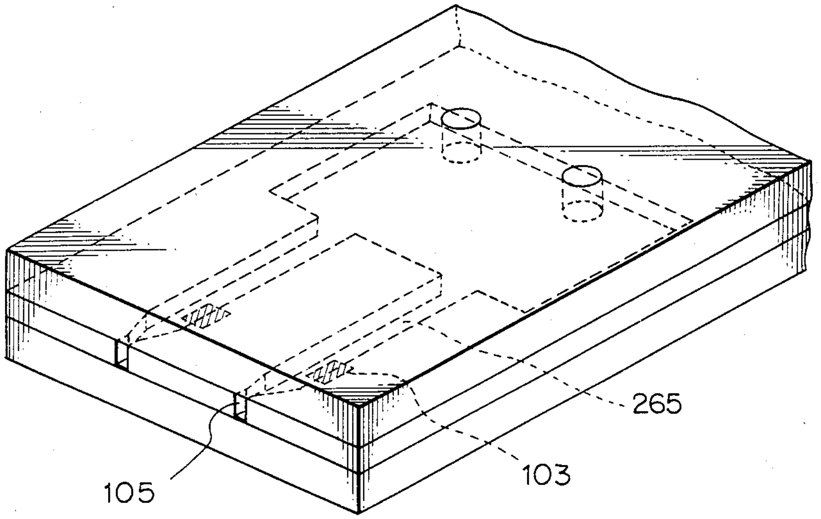
FIG. 8 shows one example of a general liquid jet recording head.

In the liquid jet recording head in accordance with the above embodiments, since the heat generation resistive layers which do not relate to the liquid discharge are arranged at the opposite ends of the liquid discharge heaters, the widths of the liquid dicharge resistive layers are essentially uniform as shown in FIG. 7. Accordingly, a uniform and high quality image is recorded.

Since the heat generation resistive layers which do not relate to the liquid discharge are formed in the same process as the liquid discharge heaters by merely adding the pattern, the manufacturing process of the recording head is not complicated.

In the above embodiments, the heat generation resistive layers 201 arranged on the opposite sides of the heaters 200 as the dummy heaters are made of the same material as the heat generation layers 200.

Alternatively, they may be made of material having the same etching rate as the heat generating resistive layers 200.

In accordance with the present invention, the widths of the heat generation resistive layers of the heaters which relate to the liquid discharge are uniform and hence the liquid jet recording head capable of recording a uniform density and high quality image is provided.

Besides, in the above explanation, the substrate on which the resistive layer provided may include the heat conductance layer is therein.

I claim:

1. A liquid jet recording head comprising:

a plurality of discharge ports through which liquid is discharged;

a plurality of electro-thermal converting elements, each provided correspondingly to each discharge port and generating thermal energy used for discharging said liquid;

said electro-thermal converting elements having a heat resistive layer provided on a substrate and an electrically conductive layer for forming at least one set of electrodes electrically connected to said heat resistive layer; and a dummy heater provided adjacent to a group of plural elements of said heat resistive layer.

2. A recording head according to claim 1, wherein said dummy heater comprises said heat resistive layer.

3. A recording head according to claim 1, wherein said dummy heater is a layer having substantially the same etching rate as that of said heat resistive layer with which said electro-thermal converting element is formed in fabrication thereof.

4. A recording head according to claim 1, said dummy heater comprises said heat resistive layer and said electrically conductive layer.

5. A recording head according to claim 4, wherein said dummy heater has said heat resistive layer and said electrically conductive layer, and is a layer having a substantially higher etching rate than that of said heat resistive layer with which said electro-thermal converting element is formed in fabrication thereof.

6. A recording head according to claim 4, wherein said electrically conductive layer is formed so that a desired distance is provided between said electrically conductive layer and said heat resistive layer.

7. A recording head according to claim 5, wherein said electrically conductive layer is formed so that the desired distance is provided between said electrically conductive layer and said layer of said dummy heater.

8. A recording head according to claim 1, wherein said dummy heater has rectangular shape.

9. A recording head according to claim 1, wherein said dummy heater is a stripe shape.

10. A recording head according to claim 1, wherein said dummy heater is divided into small pieces.

11. A recording head according to claim 10, wherein said division is performed latticedly.

12. A substrate for a liquid jet recording head, comprising a plurality of electro-thermal converting elements provided on a support member, said element having a heat resistive layer provided on said support member and an electrically conductive layer for forming at least one set of electrode electrically connected to said heat resistive layer, and a dummy heater provided on said support member and adjacent to at least both sides of the row of said plural elements.

13. A substrate for a recording head according to claim 12, wherein said dummy heater comprises said heat resistive layer.

14. A substrate for a recording head according to claim 12, wherein said dummy heater is a layer having substantially the same etching rate as that of said heat resistive layer with which said electro-thermal converting element is formed in fabrication thereof.

15. A substrate for a recording head according to claim 12, said dummy heater comprises said heat resistive layer and said electrically conductive layer.

16. A substrate for a recording head according to claim 15, wherein said dummy heater has said heat resistive layer and said electrically conductive layer, and is a layer having a substantially higher etching rate than that of said heat resistive layer with which said electro-thermal converting elements is formed in fabrication thereof.

17. A substrate for a recording head according to claim 15, wherein said electrically conductive layer is formed so that a desired distance is provided between said electrically conductive layer and said heat resistive layer.

18. A substrate for a recording head according to claim 16, wherein said electrically conductive layer is formed so that the desired distance is provided between said electrically conductive layer and said layer of said dummy heater.

19. A substrate for a recording head according to claim 12, wherein said dummy heater has rectangular shape.

20. A substrate for a recording head according to claim 12, wherein said dummy heater is a stripe shape.

21. A substrate for a recording head according to claim 12, wherein said dummy heater is divided into small pieces.

22. A substrate for a recording head according to claim 21, wherein said division is performed latticedly.

23. A substrate for a liquid jet recording head formed by the following steps;

forming a heat resistive layer for a plurality of electro-thermal converting elements in an area of a support member, said area including at least both sides of the row of said electro-thermal converting elements; and etching said formed heat resistive layer under the condition that dummy portion is provided in said both sides, so as to cause the etching rate of the resistive layer all over the area in which at least heat generating portion is provided to be constant.

* * * * *